US012128974B2

(12) United States Patent
Hurst et al.

(10) Patent No.: US 12,128,974 B2
(45) Date of Patent: Oct. 29, 2024

(54) METHOD AND SYSTEM FOR IMPROVING LOCOMOTION IN A ROBOT

(71) Applicant: Agility Robotics, Inc., Tangent, OR (US)

(72) Inventors: Jonathan Hurst, Albany, OR (US); Andrew Abate, Albany, OR (US); Mitchell Bernards, Albany, OR (US)

(73) Assignee: AGILITY ROBOTICS, INC., Salem, OR (US)

( * ) Notice: Subject to any disclaimer, the term of this patent is extended or adjusted under 35 U.S.C. 154(b) by 454 days.

(21) Appl. No.: 17/433,809

(22) PCT Filed: Feb. 25, 2020

(86) PCT No.: PCT/US2020/019753
§ 371 (c)(1),
(2) Date: Aug. 25, 2021

(87) PCT Pub. No.: WO2020/176542
PCT Pub. Date: Sep. 3, 2020

(65) Prior Publication Data
US 2022/0144358 A1   May 12, 2022

Related U.S. Application Data

(60) Provisional application No. 62/810,299, filed on Feb. 25, 2019.

(51) Int. Cl.
*B62D 57/032*   (2006.01)
*F16F 3/12*   (2006.01)

(52) U.S. Cl.
CPC .............. *B62D 57/032* (2013.01); *F16F 3/12* (2013.01)

(58) Field of Classification Search
CPC .................................. B62D 57/032; F16F 3/12
See application file for complete search history.

(56) References Cited

U.S. PATENT DOCUMENTS

| 6,532,400 B1 | 3/2003 | Jacobs |
| 8,814,151 B2 | 12/2014 | Hurst et al. |

(Continued)

FOREIGN PATENT DOCUMENTS

| EP | 1736285 B1 | 12/2006 |
| JP | 2006051585 A | 2/2006 |

OTHER PUBLICATIONS

Ezati Mahdokht et al, Effects of Toe-off and Heel-on Motions on Gait Performance of Biped Robots, 3rd RSI International Conference on Robotics and Mechatronics, IEEE, Oct. 7, 2015, pp. 7-12.

(Continued)

*Primary Examiner* — Jaime Figueroa
*Assistant Examiner* — Jamal A Shah (57) ABSTRACT

A method is disclosed for reducing impact forces to legged robots as a result of traversing a terrain. The method includes employing actuators and compliant elements to use the contact of a first portion of a foot assembly with a terrain during a step to reduce the vertical velocity of a subsequent portion of the foot assembly so that the vertical velocity of the subsequent portion as it touches the terrain is substantially zero relative to the terrain. Foot assemblies that employ these methods are also provided.

14 Claims, 6 Drawing Sheets

(56) References Cited

U.S. PATENT DOCUMENTS

| | | |
|---|---|---|
| 10,189,519 B2 | 1/2019 | Hurst et al. |
| 2005/0228539 A1 | 10/2005 | Takenaka et al. |
| 2008/0300721 A1 | 12/2008 | Takenaka et al. |
| 2009/0187275 A1 | 7/2009 | Suga et al. |
| 2010/0200312 A1 | 12/2010 | Takenaka et al. |
| 2011/0301756 A1* | 12/2011 | Yoshiike .............. B62D 57/032 901/1 |
| 2019/0240832 A1 | 8/2019 | Kawaguchi et al. |

OTHER PUBLICATIONS

Xi Weitao et al., Optimal Gaits and Motions for Legged Robots, IEEE/RSJ International Conference on Intelligent Robtos and Systems (IROS 2014), Sep. 14, 2014, pp. 3259-3265.

Bowling et al. Design of Macro/Mini Manipulators for Optical Dynamic Performance, IEEE International Conference on Robotics and Automation, 1997, pp. 449-454.

Rond et al, Eliminating Peak Impact Forces by Customizing the Passive Foot Dynamics of Legged Robots; Proceedings of the ASME 2019 Intl Design Engineering Technical Conferences and Computers and Information in Engineering Conference, Aug. 18-21, 2019, pp. 1-8.

Kemper et al, Optimal Passive Dynamics for Physical Interaction: Catching a Mass, Actuators, May 2, 2013, pp. 45-58.

International Search Report, PCT US/20/19753, mailed Jun. 5, 2020.

* cited by examiner

METHOD AND SYSTEM FOR IMPROVING LOCOMOTION IN A ROBOT

RELATED APPLICATIONS

This is an international application that claims the benefit of priority of U.S. Provisional Application No. 62/810,299, filed Feb. 25, 2019, entitled "Methods of Eliminating Peak Impact Forces of Legged Robots", the entire contents of which are incorporated herein by reference.

FIELD OF THE INVENTION

The present invention relates generally to apparatus, methods, and systems for autonomous robots and vehicles. More specifically, the present invention relates to methods and systems that enable improved autonomous legged locomotion.

BACKGROUND OF THE INVENTION

Walking and running robots must account for a number of considerations that humans and animals take for granted. Every step a legged robot takes results in a collision between the ground and the combination of leg inertia and foot mass. As a result of this collision, legged robots suffer damaged components and increased noise in sensor readings, and oscillations that can lead to stability losses.

Another problem with rigid body collisions is that they are audibly loud, which causes people and animals to be alarmed when they hear the noises and, in some cases, causes damage to the floor or terrain. If we are to realize the goal of integrating these types of robots into everyday life, the clatter caused by each step must be reduced.

Previous attempts at reducing the collisions have focused on pads made of rubber or other material on the feet. This approach is analogous to the pads on the bottom of animal feet, which are made of a fatty tissue with damping properties that attenuate impact forces and help protect the musculo-skeletal system from impact injuries. While similar padding material on a robot can reduce the jarring on the system caused by each step and reduce unwanted vibration, a reasonable thickness (comparable to animal foot pads) is not sufficient to reduce the impact from typical leg masses. Moreover, a large or very thick pad (much thicker than animal foot pads) makes control very difficult, and results in energy losses to the system, which is not ideal for robots that operate on battery power.

Another common approach to reducing collisions is to control the foot to decelerate as it approaches the ground, so it lands very slowly. This approach requires knowledge of the location of the ground surface, and is sensitive to errors in this knowledge; in addition, it takes longer for the foot to be placed, and this can limit that ability of a robot to balance itself effectively. What is needed, then, is a way to reduce the magnitude of the impact each leg makes with the ground as a legged robot ambulates, all without unduly sacrificing speed or balance.

SUMMARY OF THE INVENTION

The present description describes a foot assembly and a method for improving the legged locomotion of a robot. The foot assembly and method are designed to be used with an ambulatory robot that may be legged and may have two or more legs. In embodiments, the purpose of the foot assembly and associated method is to reduce the impact forces experienced by the robot with each step.

In certain embodiments, a foot assembly of the present invention is attached to the distal end of a legged robot's leg and comprises a first portion and a second portion. The first portion is operable upon the second portion via one or more of a first actuator and a first compliant element, wherein contact by the first portion with the terrain, when the robot takes a step, causes the one or more of a first actuator and a first compliant element to engage and reduce an initial vertical velocity associated with the second portion to substantially zero as it initially touches the terrain. In additional embodiments, the initial vertical velocity of the foot assembly as it approaches the terrain is controlled and the one or more of a first actuator and a first compliant element comprises one or more of a controlled actuator and a compliant element having a specific compliance function calibrated to the initial vertical velocity that is chosen. A controller in communication with the leg actuators controls the vertical velocity of the foot assembly.

In embodiments, the foot assembly is constructed so that the first portion has a lower effective inertia than the second portion and contacts the terrain before the second portion when the robot takes a step. As the first portion contacts the terrain, an ankle joint having one or more of an actuator and a compliant element, which rotatably connects the second portion of the foot assembly to the distal portion of each leg to permit rotation of the second portion relative to the leg, is engaged to slow the rotation of the foot assembly around the ankle joint, thereby reducing the vertical velocity of the second portion as it approaches the terrain. In embodiments, the foot assembly has a distal surface that is substantially flat, whereby the foot assembly securely engages the terrain when both the first portion and the second portion are touching the terrain.

In further embodiments, the foot assembly comprises a third portion that is operably connected to the first portion via at least one or more of a second actuator and a second compliant element. The third portion is positioned to contact the surface prior to the first portion during a step, whereby the at least one or more of a second actuator and a second compliant element engage upon contact of the third portion with the terrain to reduce the vertical velocity of the first portion to substantially zero at the point in time when it reaches the terrain during a step. In certain embodiments, the third portion comprises substantially lower effective inertia when it initially touches the terrain than the first portion with it initially touches the terrain.

In another embodiment, the present description discloses a legged robot for traversing a terrain comprising a body, two or more extendable legs, each extendable leg having a proximal end pivotally attached to the body and a distal end. At least one leg actuator is operably coupled to the proximal end of each extendable leg to rotate the extendable leg in at least a sagittal plane about the body and to extend and retract the leg along a leg length direction. In this manner, the distal end of the extendable leg is controllably extended toward the surface at a controlled vertical velocity. In some embodiments, the robot comprises a controller in communication with the at least one actuator, the controller operable to control the vertical velocity of the foot assembly whereby the first portion contacts the terrain at a controlled vertical velocity.

In embodiments, a foot assembly is rotatably coupled via an ankle joint to the distal end of each extendable leg, having at least a first portion and a second portion, the first portion operable upon the second portion via one or more of an actuator and a compliant element, whereby contact of the first portion of the foot assembly with the terrain engages the one or more of an actuator and a compliant element to reduce the vertical velocity of the second portion of the foot assembly before it contacts the terrain. Optionally, the vertical velocity of the second portion of the foot assembly is substantially reduced to zero when it initially contacts the terrain. In some embodiments, the actuators may be back-drivable actuators that apply a known, controlled force to reduce the vertical velocity of the second portion prior to initial contact with the surface.

In certain embodiments, the first portion of the foot assembly has an effective inertia when it first contacts the terrain, including reflected inertia resulting from any actuators, that is substantially less than the effective inertia of the combination of the leg and the second portion of the foot assembly when the second portion initially contacts the terrain.

In certain other embodiments consistent with the present description, a method is disclosed that reduces ground impact forces when a legged robot takes a step on a terrain. In embodiments, the method comprises providing a robot having at least a body and two or more extendable legs, each extendable leg having (a) a proximal end pivotally connected to the body for rotating the proximal end of each extendable leg about the body in at least a sagittal plane, and (b) a distal end having a foot assembly disposed thereon. The method further comprises providing the foot assembly with a first portion and a second portion, the foot assembly being configured so that the first portion contacts the terrain before the second portion when the robot takes a step. The vertical velocity of the foot assembly is controlled by a computer controller and the foot assembly contacts the ground with the first portion of the foot assembly during a stride. The vertical velocity of the second portion of the foot assembly is then reduced prior to contact with the terrain, so that the vertical velocity of the second portion is substantially zero when it initially contacts the terrain.

In still further embodiments of the present invention, the method includes reducing the vertical velocity of the second portion by activating one or more of a compliant element and an actuator engaged between the first portion and the second portion to reduce the speed at which the foot assembly rotates about the ankle joint, thereby reducing the vertical velocity of the second portion prior to reaching the terrain.

Additional disclosed embodiments comprise providing a third portion oriented to contact the terrain before the first portion, the third portion operable upon the first portion via one or more of a second actuator and a second compliant element, for reducing the vertical velocity of the first portion of the foot assembly prior to initial contact with the terrain. Still further embodiments comprise engaging a plurality of additional portions that are each sequentially operable to reduce the vertical velocities of immediately subsequent portions.

The present description describes a further embodiment of a method of reducing impact forces caused by the foot assembly impacting a terrain with each step comprising controlling a vertical velocity associated with each foot assembly as it approaches the ground so that it has a defined vertical velocity before it touches the terrain, contacting the terrain with a first portion of a foot assembly, the foot assembly comprised of a compliant element having a non-linear compliance function, and contacting the terrain with one or a plurality of additional portions of the foot assembly, each additional portion having a lower compliance than any previous portion, whereby the vertical velocity of the extendable leg connected to the foot assembly is gradually reduced to zero. In embodiments, this also includes a continuous element that gradually engages the terrain as it deforms.

In still another embodiment supported by the present description, an extendable robotic limb, mounted to a body or a base and having a proximal end disposed on the body or base and a distal end, comprises at least one limb actuator operably coupled to the proximal end of the at least one extendable limb to rotate the extendable limb in at least a sagittal plane about the body or base and to extend and retract the limb, whereby the distal end of the extendable limb is extended toward the surface at a controlled approach velocity. The extendable robotic limb further comprises a contact assembly disposed thereon comprising a first portion and a second portion, the first portion operable upon the second portion via one or more of a first actuator and a first compliant element, wherein contact by the first portion with an object or a surface causes the one or more of a first actuator and a first compliant element to become engaged and reduce the controlled approach velocity associated with the second portion to substantially zero as it initially touches the object or surface.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings:

FIG. 2b is a second embodiment of the pogo stick-type model illustrated in FIG. 2a.

While implementations of the disclosed inventions are described herein by way of example, those skilled in the art will recognize that they are not limited to the embodiments or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are not meant to be used to limit the scope of the description or the claims.

DETAILED DESCRIPTION OF THE INVENTION

In the following description, for purposes of explanation, numerous specific details are set forth in order to provide a thorough understanding of example embodiments. It will be evident to one skilled in the art, however, that embodiments can be practiced without these specific details. In some instances, well-known methods or components have not been described in detail so that the details of the present invention are not obfuscated.

In the interest of clarity, some routine features of the implementations described herein are omitted. It will be appreciated that in the development of any actual implementation of the present invention, certain decisions must be made in order to achieve specific goals, and that different decisions may be made to achieve different goals without departing from the teachings of the invention. While certain implementations might be complex and time-consuming, they would nevertheless be routine to accomplish for those of ordinary skill in the art having the benefit of this disclosure.

Figure 1:
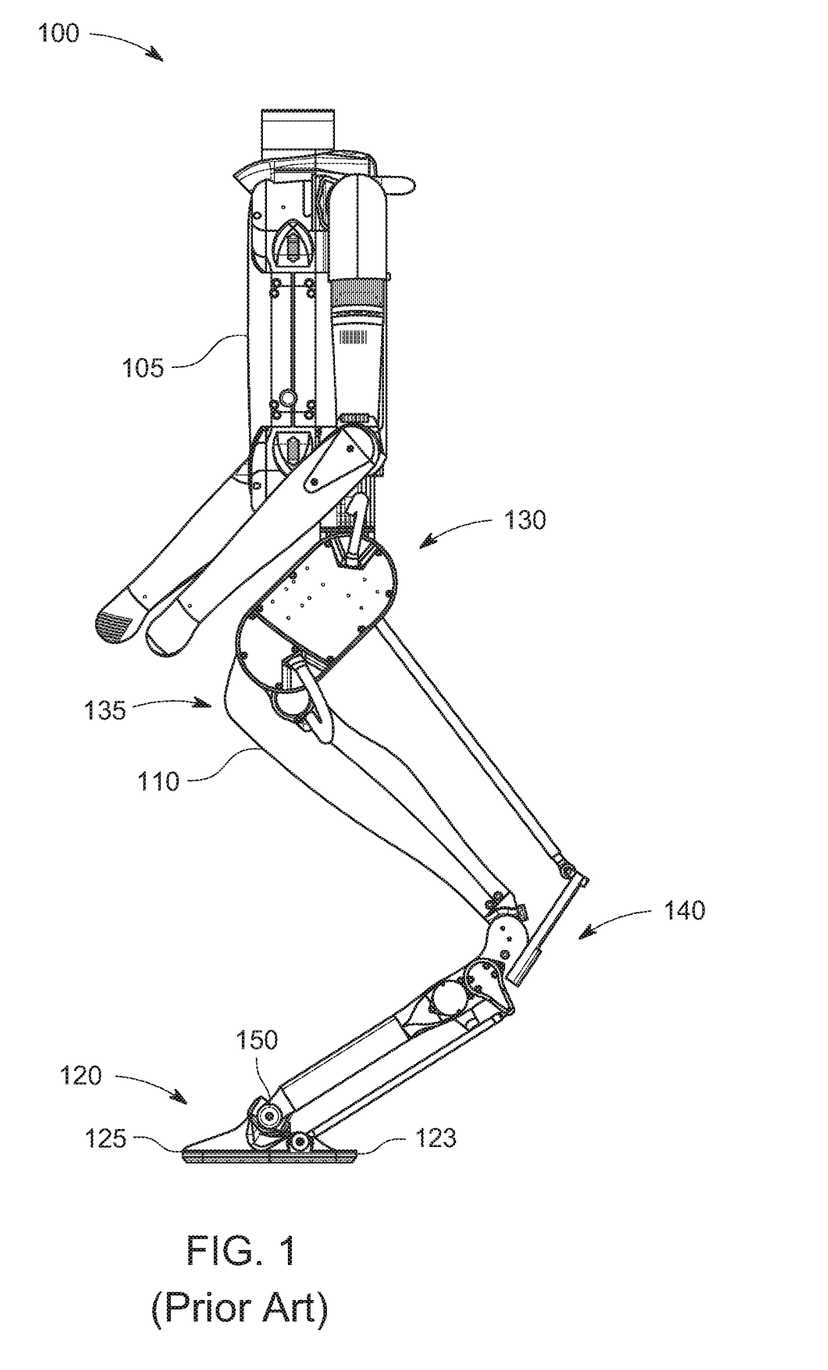
FIG. 1 is a perspective view of a prior art legged robot.

To illustrate embodiments of the present invention, a legged robot, such as the prior art legged robot 100 is illustrated in FIG. 1. The robot 100 has a body 105 and at least two extendable legs 110 that each terminate in a foot assembly 120. In order to take a step, actuators in the hip 130 and the knee 135 coordinate to cause the legs 110 to lift off the walking surface, move forward, and descend to the walking surface again. Actuators in the ankle 140 control movement in the ankle joint 150. Robot 100 does not, however, have any elements that specifically address vibration reduction or bringing leg inertia to rest as an initial phase of each step is taken. As used herein, leg inertia is defined as all of the leg's mass that changes velocity when the foot touches the ground as part of taking a step, including any rotating inertia of actuators that are operationally connected to the leg.

Modifying robot 100 in accordance with certain embodiments of the present invention, as the weight of the robot 100 begins to be supported by the foot assembly 120 during a step, a first portion 123 of the foot assembly 120 impacts the ground first. As the first portion 123 makes contact with the ground, passive elements, such as a spring, or active elements such as an actuator, whether backdriven or otherwise, cause a second portion 125 of the foot assembly 120 to reduce velocity until it reaches zero velocity and zero acceleration, which preferably occurs at the same moment that the second portion 125 touches the ground or walking surface. Zero velocity ensures ground speed matching which prevents a rigid body collision with any of the elements that make up the leg inertia. Zero acceleration ensures equalized forces above and below the foot at that moment, which means that the second portion does not inefficiently rebound off the ground in any way.

In embodiments, the first portion 123 has significantly less inertia than the leg, which becomes fully engaged with the ground when second portion 125 makes contact. In certain embodiments, the inertia of the first portion 123 is substantially less than the inertia of the leg, which effectively contacts the ground when second portion 125 does. This inertia, also called "effective inertia", includes at least the rotational inertia of the foot 120, the linear inertia of the foot 120, and the reflected inertia caused by the spinning up of any actuator that is operationally connected to the foot 120.

As the step continues, the forces applied to the foot assembly 120 by the leg 110 are increased, holding the foot spring, for example, against its hard stop for those embodiments having such a spring. This "bottoming-out" of the spring or actuator in the foot assembly 120 acts as a rigid connection between the ground and the leg 110. In this way, the foot assembly 120 has effectively matched the vertical velocity of the leg with the ground, all with a smooth force transition from zero force at contact (before touch-down), smoothly increasing force to the point of full foot contact, such that the leg now controls the forces being applied to the ground, with no collision or force spike. To further illustrate this new approach, several exemplary embodiments will be discussed herein.

Figure 2A:
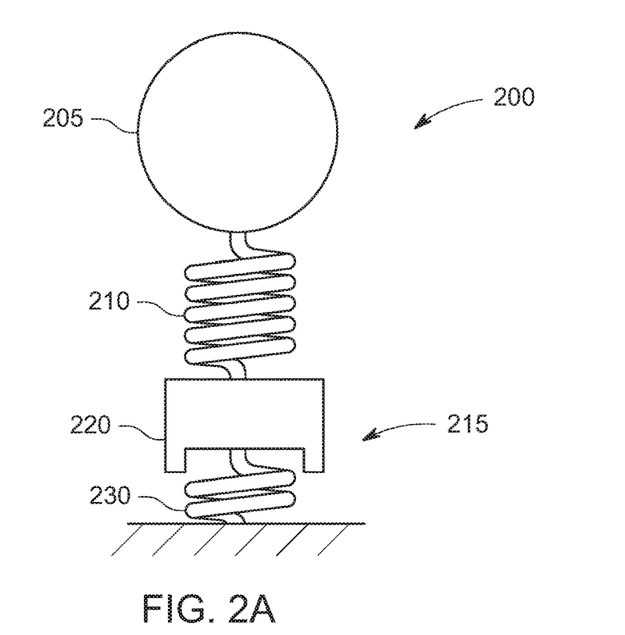
FIG. 2a is a pogo stick-type model intended as a demonstration of an embodiment of the invention.
Figure 2B:
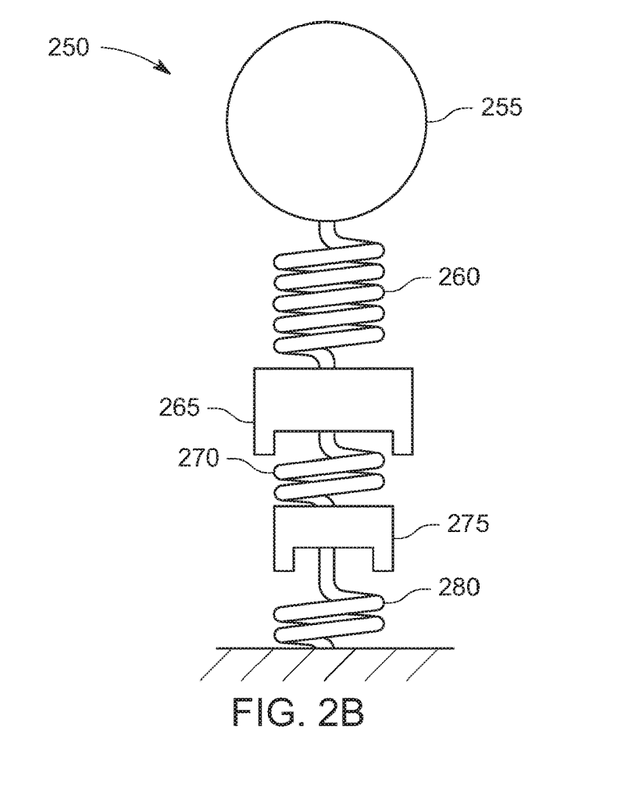

In accordance with certain embodiments of the present disclosure, a two-stage model for a leg 200 of a legged robot is illustrated by way of simplified example in FIGS. 2a and 2b. This model has a robot body 205 (with some inertia) and a leg spring 210 that are representative of the function of the leg 200 and a foot body 220 (with an effective inertia which includes any components of leg inertia that are connected to the foot rather than the body of the robot) and foot spring 230 that, together, represent a foot 215.

As the model in FIG. 2a approaches the ground during a simulated step, both the robot body and foot body 205, 220 have the same downward velocity and the springs 210, 230 are uncompressed. Upon contact with the ground, the foot spring 230 begins to compress, whereby the velocity of at least the foot body 220 begins to reduce. If the foot spring 230 is overly compliant, it does not reduce the velocity of the foot body 220 to zero prior to reaching the ground, and the foot body 220 will impact the ground at some non-zero velocity, resulting in a collision, force spike, and jolt to the system; although reduced from the case of having no spring at all. Conversely, if the foot spring 230 is too stiff, the velocity of the foot body 220 will drop to zero before the foot body 220 reaches the ground, which will cause it to oscillate before it eventually descends to the ground as the leg spring 210 continues to compress and apply larger forces to the foot body 220. If this oscillation is significant, it can cause chatter, instability, inefficiency, and other problems for robot control. If the spring constant in the foot spring 230 is tuned to the correct stiffness for the foot body 220 and a given vertical velocity, however, the foot body 220 will reach zero velocity and zero acceleration just at the moment it touches the ground.

Having the foot body 220 reach zero velocity just as it touches the ground is ideal because it means that there will be insignificant ground impact and the leg 200 will have secure ground contact through the progression of the stride until lift-off. To achieve zero foot acceleration at contact with the ground or walking surface, the downward force from the leg spring 210 must equal the upward force of the foot spring 230 at the point of contact. While the foot spring 230 may be fully compressed, the leg spring 210 has just begun to compress in the context of the stride. As the leg spring 210 continues to compress during stride, it applies additional downward force on the foot 215, which locks the foot in an incompressible state. Only as the leg spring 210 extends in the latter half of stance can the foot spring 230 decompress prior to liftoff.

In embodiments, the described methodology of designing a robot foot avoids both rigid body collisions and foot oscillations, but only for the specific tuned spring stiffnesses or actuator performance capability and a single approach velocity. Therefore, as part of a method for robot control, the vertical approach velocity should be regulated. The hardware and control system necessary for such control can be designed together, and coordinate to create the desired behavior. The foot springs and/or actuators, along with the controlled velocity approach, can be designed to support robots of many different sizes, so the rest of the robot may be created with limited consideration of the foot.

To design the foot, system parameters of the robot of interest must be known, such as the effective inertia at the foot assembly, which includes many components of the leg as well as reflected actuator inertia, leg spring function or leg actuator control algorithm, and robot inertia. The effective inertia of the components of the foot assembly that make initial contact with the terrain should be minimized to reduce impact forces. Given these system parameters, a compliant element in the foot and/or actuator and controller may be designed to bring the foot inertia (including the components of the leg attached directly to the foot) to zero velocity at impact from a specific velocity of approach. The gait control method applied on the robot may control the foot's approach to the terrain to a controlled vertical velocity relative to the terrain, so it will impact at the controlled velocity regardless of whether the ground is located in the expected location or not.

While the foregoing has described an embodiment that employs springs to reduce vertical velocity of the foot body 220 after contact by the toe with the ground, those of skill in the art will recognize that, in some embodiments, springs can either be replaced by actuators or can be complemented by actuators (such as placing an actuator in series or in parallel with a spring) in order to reduce the vertical velocity of the foot body 220 as it approaches the ground in a manner consistent with the methodology described. In such an embodiment, a linear actuator is employed under the foot body 220 to apply some force function at impact to decelerate, or assist in the deceleration of, the foot body 220 to zero at the moment of full compression and touchdown with the ground or walking surface.

A logical extension of the two-stage model set forth in FIG. 2a is the model illustrated in FIG. 2b wherein a three stage model of a leg 250 is illustrated. Like the model of FIG. 2a, this model has a robot body 255 and a leg spring 260 that are representative of the function of the leg 250. Below the leg spring 260 is a first foot body 265 and first foot spring 270 in series with a second foot body 275 and a second foot spring 280 that, together, represent a foot 285. In terms of relative inertia, certain embodiments of the system have a first foot body 265 having an inertia that is substantially lower than the inertia of the robot body 255 and substantially greater than the inertia of the second foot body 275. Each spring has a spring constant (k) that is tuned to the effective inertia it is expected to handle so that it can controllably reduce the velocity of the body 255, 265, 275 above it to substantially zero at the moment it touches the terrain. Those of skill in the art will recognize that a theoretically limitless number of additional spring-mass stages can be added. In certain embodiments, a material having the properties of a non-linear spring could be created that gradually applies greater and greater reactive force to resist the inertia of the foot and leg of the robot as it takes a step.

Figure 3:
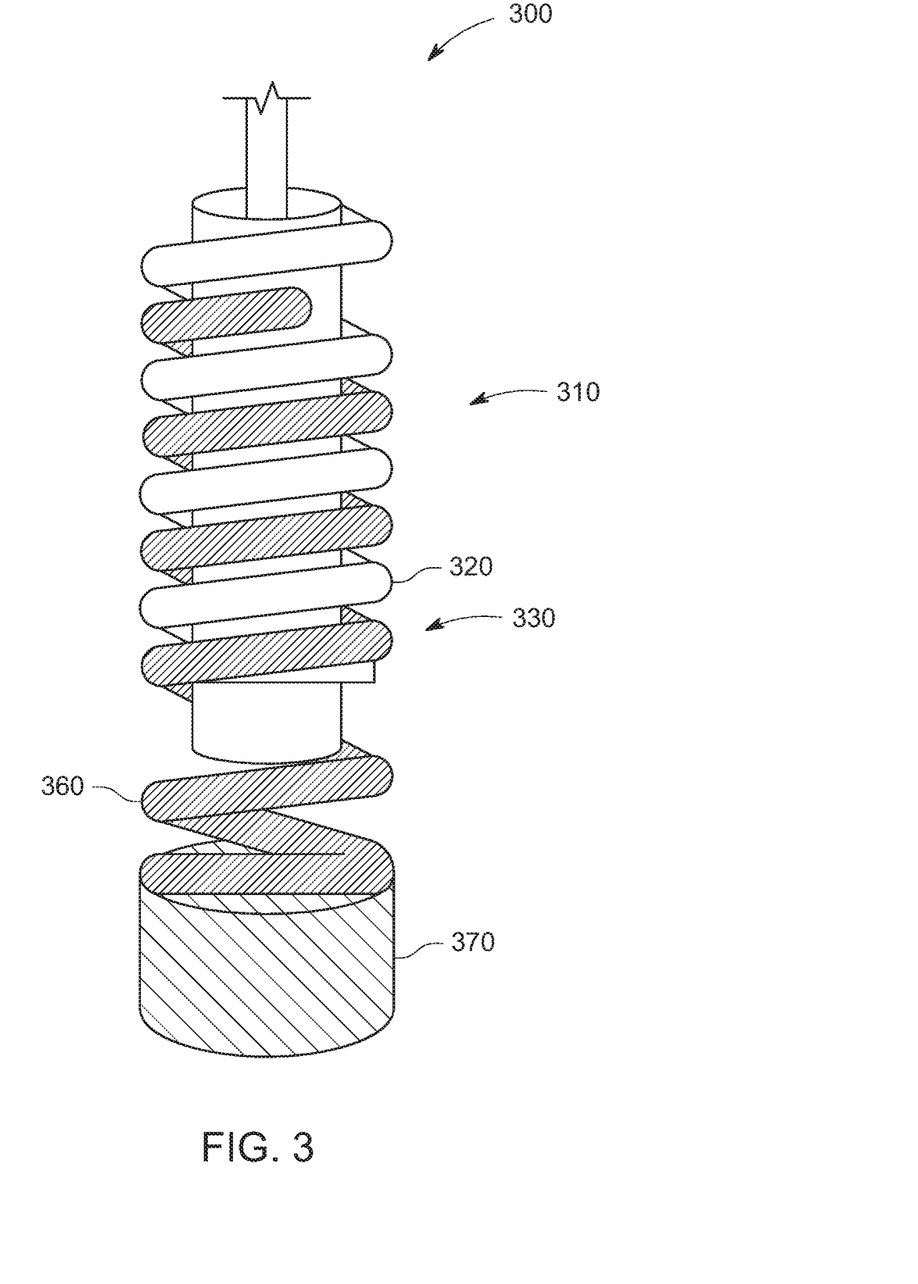
FIG. 3 is an illustration of a spring model illustrating certain aspects of the present invention.

For purposes of further explanation through the use of models, FIG. 3 illustrates a pogo stick foot 300 embodiment of the present disclosure. The pogo stick foot assembly 300 has a sleeve portion 320, an outer portion of which is engaged with an external spring 360 via external threads 310. A lower portion of the external spring 360 extends below the sleeve portion 320 in a fully extended position. In embodiments, the lower portion of the spring 360 is fixably connected to a lightweight, tough toe material 370 that makes contact with the ground. In operation, as the toe material 370 engages with the ground, such as during the beginning portion of a stride, the external spring 360 begins to compress and generates forces resistant to compression that are translated to the sleeve portion 320 via the external threads 310 in which the spring is captured. In ideal operation, the sleeve portion 320 makes contact with the toe material 370 at the exact point in time when the sleeve portion 320 arrives at zero velocity and zero acceleration, as a result of the upward forces applied to the sleeve portion 320 by the spring 360.

In relation to the model 200 of FIG. 2a, the toe material portion 370 action in conjunction with the external spring 360 is analogous to the interaction of the foot spring 230 with the "foot body." As used herein, the toe material portion 370 also referred to as the "first portion." In the context of a robot taking a step with the pogo stick foot 300 at the end of a leg, the toe material portion 370 and spring 360 would make first contact with the terrain. As the spring 360 begins to compress after contact with the terrain, the vertical velocity of the sleeve portion 320 is reduced. In embodiments, the sleeve portion 320 is referred to as the "main support portion" or the "second portion" of the foot assembly. If the pogo stick foot 300 approaches the ground at a predetermined or controlled initial velocity, the spring 360 slows the descent of the sleeve 320 so that both velocity and acceleration zero out at or near the moment in time that the sleeve 320 contacts the toe element 370, effectively engaging rigidly with the ground or other walking surface. Then, as the stride continues, additional force is applied to the sleeve 320, keeping the spring 360 fully compressed throughout the stride.

Figure 4:
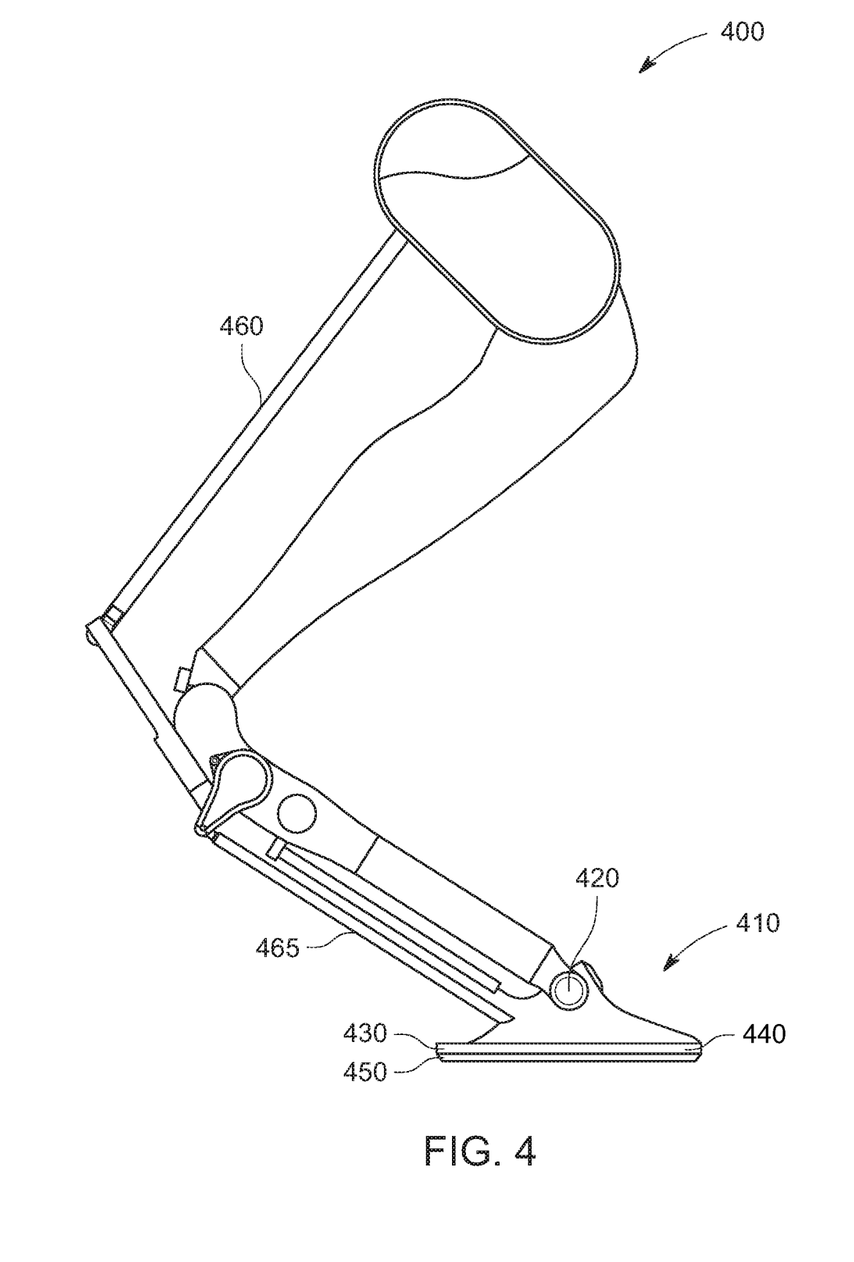
FIG. 4 is an illustration of a robot leg constructed in accordance with certain embodiments of the present invention.

Now with reference to FIG. 4, a robot leg 400 constructed in accordance with certain embodiments of the present invention is illustrated. The foot 410 is comprised of a rotational ankle joint 420 providing a functional connection point between the leg 400 and foot 410. In embodiments, the foot 410 is designed and constructed to operate in a two stage manner, similar to the discussion regarding FIGS. 2a, 2b, and 3. During a stride, a first portion 430 of the foot 410 contacts the ground first and, when it does, the rotational ankle joint 420 employs passive dynamics, such as one or more springs, to reduce the vertical velocity, relative to the terrain, of the second portion 440. In certain embodiments, an actuator is added or used independently to apply a force to reduce the vertical velocity of the forward portion 440 relative to the terrain, substantially reaching zero (or matching the velocity of the terrain) at the point of contact. In certain embodiments, the ankle joint 420 employs a combination of both passive and active elements. The first portion 430 of the foot 410 is analogous to the foot body 220 and the toe material 370 discussed in relation to FIGS. 2 and 3. Importantly, the ankle joint 420 receives the inertia of the robot leg and it is therefore important to cause the vertical velocity of the second portion 440 (and as a result, the ankle joint 420) to be reduced substantially to zero as it touches the ground.

Figure 5A:
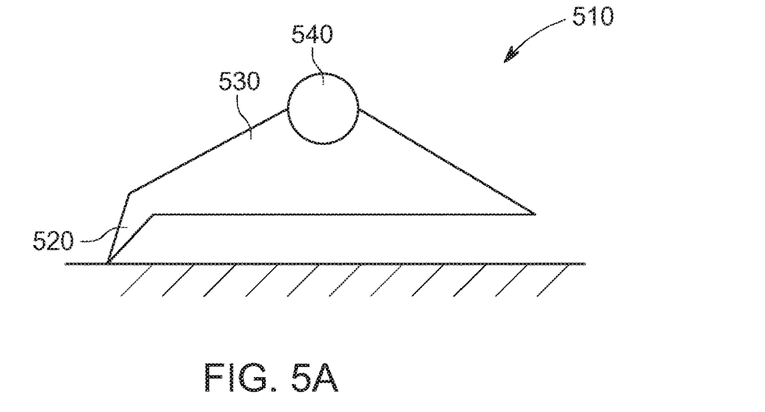
FIGS. 5a-5c illustrate a foot assembly constructed in accordance with an embodiment of the present invention at three successive points in a stride.
Figure 5B:
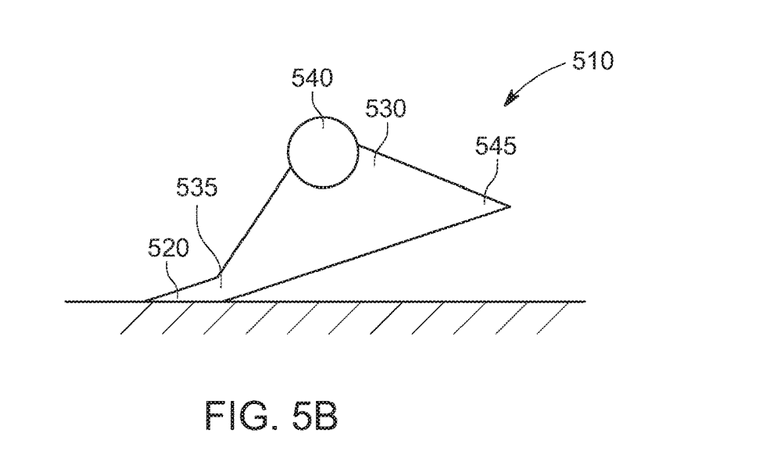
Figure 5C:
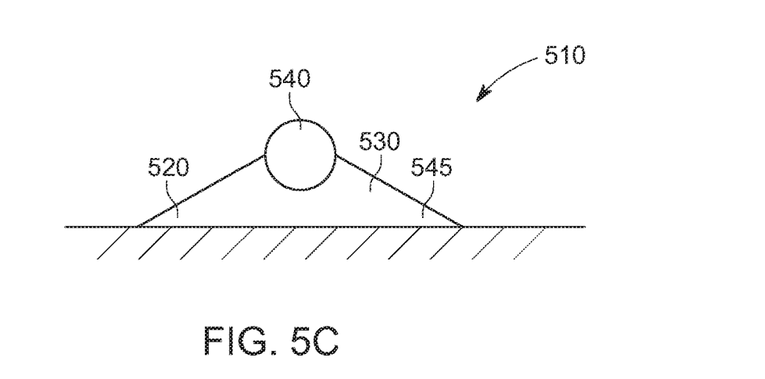

FIGS. 5a-5c illustrate a time progression of the manner of operation of another embodiment of a foot assembly 530 further reducing any impact forces that may be experienced by a robot employing the methods and assemblies disclosed herein. Like previously discussed assemblies in FIGS. 2-4, the disclosed foot assembly 530 has a first portion 535 and a second portion 545 wherein the first portion 535 is expected to contact the terrain prior to the second portion 545 and the ankle joint 540 employs one or more of a compliant element and an actuator to impede the rotation of the foot assembly about the ankle joint 540, thereby causing the second portion 545 to contact the terrain just as the vertical velocity of the second portion 545 reaches substantially zero, relative to the terrain. Unlike the assemblies of previous figures, however, foot assembly 530 has a third portion 520 that is pivotally disposed on the first portion 535. In certain embodiments, the third portion 520 may be comprised of aluminum with a foam covering that is attached to first portion 535 via a torsional spring. In other embodiments, first portion 535 may be rotatably connected via an actuator, including, alternatively a back-driveable actuator. In either case, third portion 520 is the initial component to come into contact with the terrain during a step. Upon contact with the terrain, as illustrated in FIG. 5b, the third portion 520 is rotationally forced upward in relation to the first portion 535, causing the torsional spring or other compliant element and/or actuator to engage and reduce the vertical velocity of the first portion 535 so that its vertical velocity at the initial point of contact with the terrain matches terrain velocity, thus preventing sudden impact forces from occurring.

In certain other embodiments, the third portion 520 is constructed with a compliant foam or other material having a linear or non-linear compliance appropriate for the application or configuration of the robot. Upon contact with the ground or walking surface, the compliant material further decelerates the first portion 535, until it initially contacts the terrain at a matched terrain velocity, analogous to the lowest and softest spring 280 illustrated in FIG. 2b.

After the rearmost part 535 has touched down, the joint 540, having one or both of a spring and an actuator, applies torque to decelerate the rotation of the main support portion 530 about the joint 540 so that the lower leg (not shown), attached at joint 540, and frontmost part 545 of the main support portion have zero vertical velocity at the point in time when the main support portion 530 "bottoms out" on the ground, as shown in FIG. 5c. This is analogous to the function of the middle spring 270 and mass 265 in FIG. 2b.

As a result, from the time of initial contact of third portion 520, represented in FIG. 5a, through the initial point of contact of the first portion 535 of the foot assembly 530 with the terrain as illustrated in FIG. 5b, until the point in time when the second portion 545 contacts the terrain as shown in FIG. 5c, there is a smooth ramping of force that counteracts and reduces the vertical velocity of the leg, represented herein by the ankle joint 540, toward the terrain to match the velocity of the terrain at contact, substantially reducing any force associated with such an impact. While typical human heel to toe foot assembly structure for a "heel to toe" gait has been illustrated, it is to be understood that the presently disclosed structure and methods can equally be applied to a "toe-to-heel" gait, such as that exhibited by birds, for example.

Those skilled in the art will recognize that additional embodiments may comprise additional portions and corresponding connectively engaged compliant elements or actuators, with descending effective inertia, to create a force ramp that is as smooth as possible. In certain embodiments, the same functionality may be created with a single shaped structure of nonlinear compliance. This structure may contact the ground with a comparatively soft portion, and as the forces increase during the stride, engage greater and greater surface area of the foot with increasing stiffness of the foot structure, so it behaves as a single nonlinear spring that could be approximated by a multitude of links and springs of increasing stiffness. In further embodiments, a transmission, such as a cable or tendon transmission, causes an actuator to behave with varying effective inertia and torque as a shaped foot component engages with the ground; acting as a series of increasingly large actuators and links would act. This continuous shifting of compliance and actuator may result in a smoother force ramp than individual links and compliant elements or actuators, while still achieving the function of decelerating the leg mass to ground speed and avoiding any substantial impact forces.

In certain embodiments, where an actuator is employed in the ankle joint 540, it may be oriented so that when the foot assembly 530 first touches the terrain at the first portion 535, the actuator backdrives to slow the vertical velocity of the second portion 545 until it reaches the terrain. The same principle can apply to the relationship of the third portion 520 to the initial touchdown of the first portion 535. As the stride progresses beyond touch-down, any of the actuators can then operate normally to assist with pushing the robot forward in the latter part of the stride.

In other embodiments, a spring or other compliant element need not be located in the ankle joint 420, 540. Instead, it could be placed at the top of the leg 400 of the robot, so long as appropriate linkage 460 or 465 exists, such as in FIG. 1 or 4. In embodiments, a back-driveable actuator, such as a CSG-2A cup-type component set from Harmonic Drive, could be used to reduce the downward or "vertical" velocity of the first portion 535 or the second portion 545 of the foot assembly 530.

Figure 6:
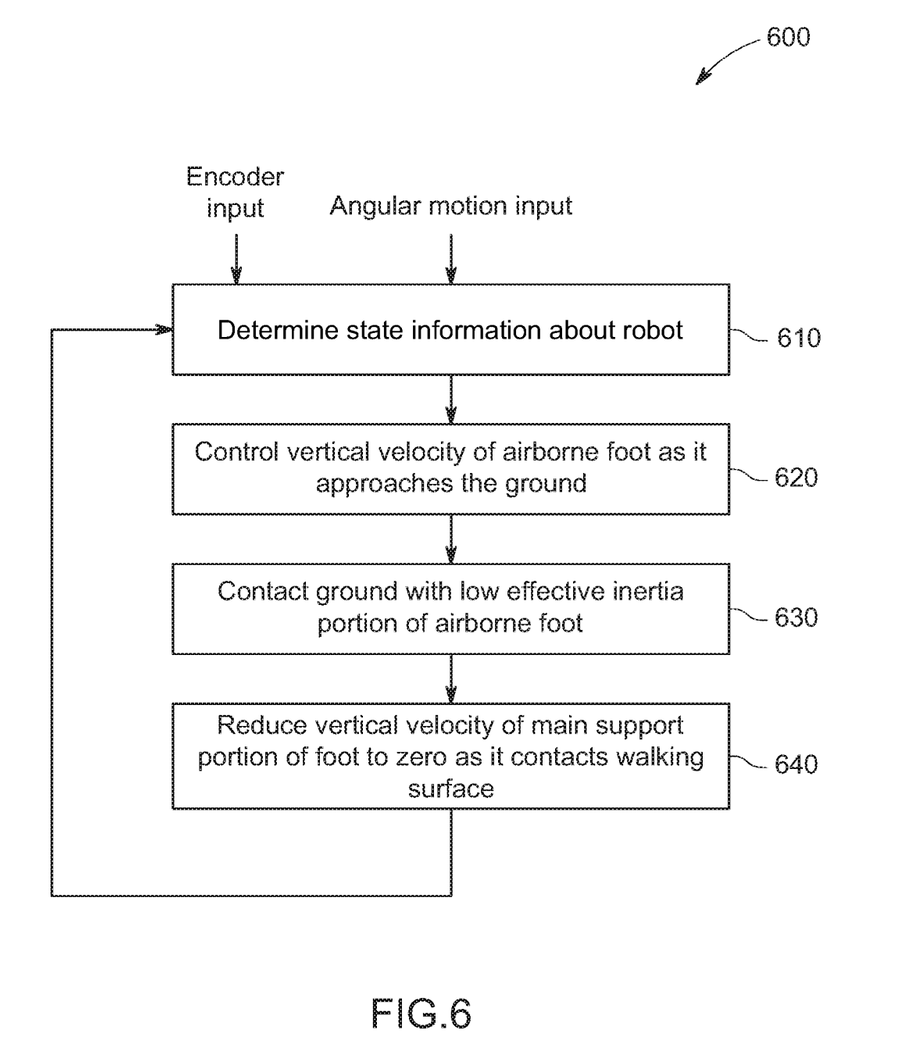
FIG. 6 is a flow chart describing an embodiment of the method of the invention set forth herein.

In certain embodiments, such as the method referenced in FIG. 6, the disclosed system employs a method 600 of enabling a legged robot to traverse a terrain, while minimizing the jarring associated with placing each foot assembly and transferring the weight of the robot to that foot during the act of walking. An embodiment of the method comprises first determining the state of the robot 610. This step includes determining the relative locations and/or positions of all of the limbs of the robot using encoders and other sensors. In certain embodiments, encoders are positioned in every joint so that a robot movement controller knows the relative location of every body part at all times. In embodiments, the orientation of the robot body relative to the ground is also tracked using an angular rate measurement device, such as a gyroscope or an inertial measurement device. These sensors provide information about roll, pitch and yaw of the robot body. Armed with this information, and assuming a first foot is on the ground, it is possible to calculate the relative position of an airborne foot during a stride. This location then becomes part of the state information.

Next, the method involves controlling the downward vertical velocity of the foot assembly as it approaches the walking surface 620 so that it is within predetermined parameters at the point of initial ground contact. In certain embodiments, the vertical velocity can be controlled by actuators at the top of the leg in what could be called the hip area or in another joint analogous to a human knee. In embodiments, all encoder and other sensor data is transmitted to a central processor that, in turn, calculates state information and any appropriate future movements and controls the operation of any actuators that are used.

In certain embodiments, the foot has been designed so that a low effective inertia ("first") portion makes contact with the terrain prior to a main support ("second") portion. In such embodiments, the next step 630 is for the low effective inertia ("first") portion to contact the ground and begin to reduce the vertical velocity of the main support ("second") portion of the foot 640 prior to it reaching the terrain In embodiments, the low effective inertia portion is able to act upon the main support portion via a spring and/or actuator and preferably speed match a part of the main support portion with the ground or walking surface as has been discussed herein. Those of skill in the art will recognize that this process can be repeated with additional foot portions having less effective inertia than existing portions and further having mated springs and/or actuators sufficient to control the vertical velocity of the subsequent portions, such as was demonstrated with respect to FIG. 2b. Further, that a large number of foot portions and compliant elements can be equivalent to a single shaped structure with varying nonlinear compliance, as the engagement with the terrain progresses through the point of initial contact to fixed engagement.

In certain embodiments, as the foot touches the terrain in the next step of the walking method, such as at 630, the actual vertical speed with which the foot assembly is approaching the ground can be confirmed by measuring how quickly the low mass portion of the foot moves upon contact with the terrain. If it is determined that the foot assembly is approaching the terrain faster than planned, such as if the robot had been pushed and had to place the foot assembly more quickly than intended to maintain balance, the controller on the relevant actuators could be adjusted in real time to accommodate the unexpected approach velocity and still be able to reduce the velocity to zero at main support portion impact.

In certain embodiments, where a leg is connected to a main support portion of a foot as in FIG. 5, the foot strike may be designed such that the second portion 545 will contact first, rather than the first portion 535. In such an embodiment, an additional element, similar to 520, may instead be connected to the second portion. This is analogous to a toe-first contact, as in ostriches or other running birds, rather than a heel-first contact, as in humans. The method of the invention can be employed with success in either gait type.

In certain embodiments, the foot assembly 310, 410 or 510 has at least two separate but connected portions: a low effective inertia (or "first") portion 370, 450 or 535 that is designed to make initial contact with the terrain and a main support (or "second") portion 320, 440, 545, which carries the effective inertia of the leg and foot and must be firmly engaged with the ground during mid-stance. In embodiments, the low effective inertia portion 370, 450, or 535 has an effective inertia that is approximately one order of magnitude less than the effective inertia of the main support portion 320, 440, or 545.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

We claim:

1. In an ambulatory robot having at least two legs for traversing a terrain, a foot assembly attached to a distal end of each leg for minimizing sudden forces to the robot during a touch-down phase of a terrain-contacting portion of a stride, the foot assembly comprising:
   a first foot portion having a first portion vertical velocity and a second foot portion having a second portion vertical velocity, the first foot portion operable upon the second foot portion via one or more of a first actuator and a first compliant element;
   wherein contact with the terrain by the first foot portion, at the beginning of the touch-down phase, changes the first portion vertical velocity so that it matches a terrain velocity, thereby engaging the one or more of a first actuator and a first compliant element to reduce the second portion vertical velocity to match a terrain velocity as it contacts the terrain;
   whereupon the second foot portion remains securely in contact with the terrain during a remainder of the terrain-contacting portion of the stride.

2. The foot assembly of claim 1, wherein the vertical velocity of the foot assembly relative to the terrain, prior to the touch-down phase is controlled.

3. The foot assembly of claim 1, wherein the first foot portion has a first portion effective inertia and the second foot portion has a second portion effective inertia and the one or more of a first actuator and a first compliant element are selected to have a specific compliance function calibrated to the first portion effective inertia and the second portion effective inertia.

4. The foot assembly of claim 3, wherein the first portion effective inertia is less than the second portion effective inertia prior to the touch-down phase.

5. The foot assembly of claim 1, further comprising a third foot portion operably connected to the first foot portion via at least one or more of a second actuator and a second compliant element, the third foot portion positioned to contact the terrain prior to the first foot portion at the beginning of the touch-down phase; whereby the at least one or more of the second actuator and second compliant element engage upon contact of the third foot portion with the terrain to reduce the vertical velocity of the first foot portion to substantially zero at the point in time when it reaches the terrain.

6. The foot assembly of claim 5, wherein the third foot portion comprises lower effective inertia when it initially touches the terrain than the first foot portion when it initially touches the terrain.

7. A legged robot for traversing a terrain comprising:
   a body;
   two or more extendable legs, each extendable leg having a proximal end pivotally attached to the body and a distal end;
   at least one leg actuator operably coupled to the proximal end of each extendable leg to rotate the extendable leg in at least a sagittal plane about the body and to extend and retract the leg along a leg length direction, whereby the distal end of the extendable leg is controllably extended toward the surface at a controlled vertical velocity;
   a foot assembly rotatably coupled via an ankle joint to the distal end of each extendable leg, the foot assembly having at least a first portion and a second portion, the first portion operable upon the second portion via one or more of an actuator and a compliant element;
   the foot assembly is further comprised of one or more backdrivable actuators that apply a known, controlled force to reduce the vertical velocity of the second portion prior to initial contact with the surface;
   whereby contact of the first portion of the foot assembly with the terrain engages the one or more of an actuator and a compliant element to reduce the vertical velocity of the second portion of the foot assembly relative to the terrain before it contacts the terrain.

8. A method of reducing ground impact forces when a legged robot takes a step on a terrain, the method comprising:
   providing a robot having at least a body and two or more extendable legs, each extendable leg having (a) a proximal end pivotally connected to the body for rotating the proximal end of each extendable leg about the body in at least a sagittal plane, and (b) a distal end having a foot assembly disposed thereon;

providing the foot assembly with a first portion and a second portion, the foot assembly configured so that the first portion contacts the terrain before the second portion when the robot takes a step;

controlling the vertical velocity of the foot assembly as the foot assembly approaches the terrain during a step;

contacting the ground with the first portion of the foot assembly during a stride;

reducing the vertical velocity of the second portion of the foot assembly prior to contact with the terrain by engaging at least one of an ankle compliant element and an ankle actuator, whereby the vertical velocity of the second portion is substantially zero when it initially contacts the terrain.

9. The method of claim 8, further comprising providing a third portion operable upon the first portion for reducing the vertical velocity of the first portion of the foot assembly prior to initial contact with the terrain, whereby the vertical velocity of the first portion is substantially zero when it initially contacts the terrain.

10. The method of claim 9, wherein the third portion is positioned to contact the terrain prior to the first portion during a step; whereby the at least one or more of a second actuator and a second compliant element engage upon contact of the third portion with the terrain to reduce the vertical velocity of the first portion substantially to zero at the point in time when it reaches the terrain during a step.

11. The method of claim 9, further comprising engaging a plurality of additional portions that are each operable to reduce the vertical velocity of an immediately preceding portion prior to initially contacting the terrain.

12. In an ambulatory robot having a body, at least two extendable legs, and a foot assembly disposed at a distal end on each of the legs, a method of reducing impact forces caused by the foot assembly impacting a terrain with each step, the method comprising:

controlling a vertical velocity associated with each foot assembly as it approaches the ground so that it has a defined vertical velocity before it touches the terrain;

contacting the terrain with a first portion of a foot assembly, the foot assembly comprised of a compliant element having a nonlinear compliance function;

contacting the terrain with one or a plurality of additional portions of the foot assembly, each additional portion having a lower compliance than any previous portion;

whereby the vertical velocity of the distal end of the extendable leg connected to the foot assembly is gradually reduced to substantially zero.

13. A foot assembly disposed at a distal end of a leg of an ambulatory robot, the foot assembly adapted to minimize contact forces caused by a touch-down phase of a stride on a terrain and to support the robot during a weight supporting phase that immediately follows the touch-down phase, the foot assembly comprising:

a first foot portion and a second foot portion, each foot portion having a vertical velocity; and one or more of an actuator and a compliant element functionally connecting the first foot portion to the second foot portion;

whereby contact of the first foot portion with the terrain during the touch-down phase causes the vertical velocity of the first foot portion to match a terrain velocity and engages the one or more of an actuator and a compliant element to reduce the vertical velocity of the second portion until it substantially matches the terrain velocity when the second portion reaches the terrain at the end of the touch-down phase;

wherein at least the second foot portion remains securely engaged with the terrain to support the full weight of the robot during the weight-supporting phase of the stride.

14. A foot assembly for improving a terrain-contacting portion of a stride on a terrain for an ambulatory robot, the terrain-contacting portion comprising a touch-down phase and a weight-supporting phase, the foot assembly comprising:

a first foot portion having and a second foot portion, each portion having a vertical velocity approaching the terrain prior to the touch-down phase that creates a first foot portion effective inertia and a second foot portion effective inertia, the first foot portion effective inertia being less than the second foot portion effective inertia; and one or more of an actuator and a compliant element functionally associating the first foot portion with the second foot portion whereby contact of the first foot portion with the terrain at the beginning of the touch-down phase causes the vertical velocity of the first portion to match a terrain velocity, thereby engaging the one or more of an actuator and a compliant element to gradually reduce the vertical velocity of the second portion to substantially match the terrain velocity by the time the second portion makes contact with the terrain at the end of the touch-down phase and supports the robot through the weight-supporting phase of the stride;

whereby the second foot portion remains securely engaged with the terrain to support the full weight of the robot during the weight-supporting phase of the stride.

\* \* \* \* \*